US008144139B2

(12) United States Patent
Hsu et al.

(10) Patent No.: US 8,144,139 B2
(45) Date of Patent: Mar. 27, 2012

(54) DISPLAY PANEL MODULE

(75) Inventors: Sheng-Kai Hsu, Hsin-Chu (TW); Chih-Hsiang Yang, Hsin-Chu (TW)

(73) Assignee: AU Optronics Corp., Hsinchu (TW)

( * ) Notice: Subject to any disclaimer, the term of this patent is extended or adjusted under 35 U.S.C. 154(b) by 1254 days.

(21) Appl. No.: 11/723,269

(22) Filed: Mar. 19, 2007

(65) Prior Publication Data

US 2008/0036957 A1 Feb. 14, 2008

(30) Foreign Application Priority Data

Aug. 8, 2006 (TW) ................................ 95129086 A

(51) Int. Cl.
*G06F 3/038* (2006.01)

(52) U.S. Cl. ........... 345/205; 345/87; 345/211; 349/151

(58) Field of Classification Search ......................... None
See application file for complete search history.

(56) References Cited

U.S. PATENT DOCUMENTS

| | | | | |
|---|---|---|---|---|
| 5,956,011 | A * | 9/1999 | Koyama et al. | 345/98 |
| 6,388,651 | B1 * | 5/2002 | Kinoshita et al. | 345/98 |
| 6,664,942 | B1 | 12/2003 | Kim et al. | |
| 7,667,677 | B2 * | 2/2010 | Yi et al. | 345/87 |
| 2001/0048415 | A1 * | 12/2001 | Morii | 345/87 |
| 2002/0008682 | A1 * | 1/2002 | Park | 345/87 |
| 2002/0060661 | A1 * | 5/2002 | Nah et al. | 345/99 |
| 2002/0140654 | A1 | 10/2002 | Kim et al. | |
| 2003/0043100 | A1 | 3/2003 | Moon | |
| 2003/0227430 | A1 * | 12/2003 | Chiang et al. | 345/92 |
| 2004/0027526 | A1 | 2/2004 | Pai | |
| 2004/0135757 | A1 * | 7/2004 | Park et al. | 345/98 |
| 2005/0078459 | A1 | 4/2005 | Yeon | |
| 2005/0152189 | A1 * | 7/2005 | Kim et al. | 365/185.29 |
| 2005/0162603 | A1 | 7/2005 | Cheng et al. | |
| 2005/0184978 | A1 | 8/2005 | Bu et al. | |
| 2006/0033691 | A1 * | 2/2006 | Ku et al. | 345/87 |
| 2006/0202938 | A1 * | 9/2006 | Chen et al. | 345/100 |
| 2006/0232579 | A1 * | 10/2006 | Chen et al. | 345/211 |

FOREIGN PATENT DOCUMENTS

| | | | |
|---|---|---|---|
| CN | 1719310 | A | 1/2006 |
| TW | 525134 | B | 3/2003 |
| TW | 200401934 | | 2/2004 |
| TW | I233078 | | 5/2005 |
| TW | 200604980 | | 2/2006 |
| TW | 200609893 | | 3/2006 |

* cited by examiner

*Primary Examiner* — Alexander Eisen
*Assistant Examiner* — Matthew Yeung
(74) *Attorney, Agent, or Firm* — Rabin & Berdo, P.C.

(57) ABSTRACT

In a display panel module, a first group and a second group of data driver chips are separately cascaded on a first side of a display panel. A scan driver chip is disposed on a second side of the display panel. A first flexible printed circuit (FPC) is connected between a printed circuit board (PCB) and the display panel for transmitting signals to the first group of data driver chips, the second group of data driver chips and the scan driver chip, respectively.

10 Claims, 6 Drawing Sheets

DISPLAY PANEL MODULE

RELATED APPLICATIONS

This application claims priority to Taiwan Application Serial Number 95129086, filed Aug. 8, 2006, which is herein incorporated by reference.

BACKGROUND

1. Field of Invention

The present invention relates to a flat panel display. More particularly, the present invention relates to a display panel module of a flat panel display.

2. Description of Related Art

Conventional display panels have two types of tape carrier packages (TCPs). Each TCP type only contains data driver chips or scan driver chips, which are respectively connected to the data lines or the scan lines to drive the pixels of the display panel. Display panel demand and cost concerns have created a tendency to omit the additional tape carrier packages, for example, by directly bonding driver chips on the glass substrate (i.e. Chip On Glass; COG).

FIG. 1 is a schematic view of a conventional display panel module 100. The data driver chips 112 and the scan driver chips 114 are directly bonded on a glass substrate of a display panel 110. A printed circuit board 120 includes a timing controller 122, a gamma voltage generator 124 and a DC/DC converter 126. The timing controller 122 and the gamma voltage generator 124 separately provide data signals, such as timing signals and gamma voltages, to the data driver chips 112. The DC/DC converter 126 provides power signals to the data driver chips 112 and the scan driver chips 114.

Under this conventional architecture, each data driver chip 112 receives its own timing signals from the timing controller 122, respectively, and several separate flexible printed circuit boards (not illustrated) or other connections are required to electrically connect with the timing controller 122 disposed on the printed circuit board 120. Therefore, the printed circuit board 120 must have the same length as the glass substrate of the display panel 110 in order to correspondingly connect all of the data driver chips 112 so as to increase the cost and reduce the yield of manufacture. In addition, the scan driver chip 114 needs some flexible printed circuit boards to connect to the timing controller 122 and the DC/DC converter 126 located on the printed circuit board 120. These flexible printed circuit boards will increase the cost, and decrease the manufacturing yields.

SUMMARY

According to one embodiment of the present invention, a display panel module comprises a printed circuit board, a display panel, a first group of data driver chips, a second group of data driver chips, at least one scan driver chip and a first flexible printed circuit board. The first group of data driver chips are cascaded to one another and mounted on a first side of the display panel. The second group of data driver chips are cascaded to one another and mounted on the first side of the display panel. The scan driver chip is mounted on a second side of the display panel. The first flexible printed circuit board is disposed between the printed circuit board and the display panel, and transmits signals to the first group of data driver chips, the second group of data driver chips and the scan driver chip, respectively.

According to another embodiment of the present invention, a display panel module comprises a printed circuit board, a display panel, a first group of data driver chips, a second group of data driver chips, at least one scan driver chip, a first flexible printed circuit board and a second flexible printed circuit board. The first group of data driver chips are cascaded to one another and mounted on a first side of the display panel. The second group of data driver chips are cascaded to one another and mounted on the first side of the display panel. The scan driver chip is mounted on a second side of the display panel. The first flexible printed circuit board is disposed between the printed circuit board and the display panel, and transmits signals to at least one of the first group of data driver chips and the second group of data driver chips. The second flexible printed circuit board is disposed between the printed circuit board and the display panel, and transmits signals to the first group of data driver chips and the scan driver chip.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Figure 1:
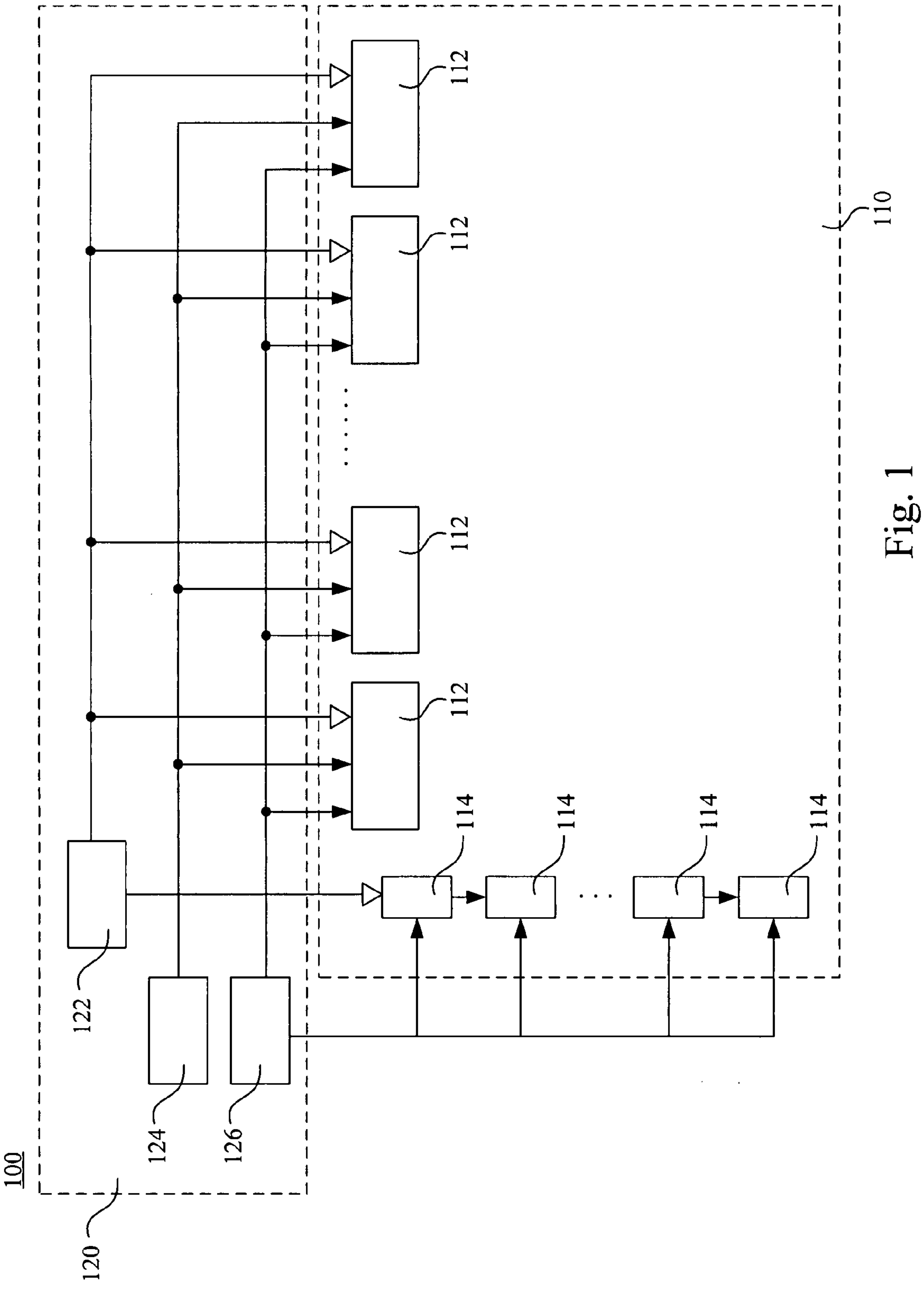
Fig. 1 (Prior Art)
FIG. 1 is a schematic view of a conventional display panel module.

Reference will now be made in detail to the present preferred embodiments of the invention, examples of which are illustrated in the accompanying drawings. Wherever possible, the same reference numbers are used in the drawings and the description to refer to the same or like parts.

The embodiments of the present invention employ a flexible printed circuit board to transmit signals to the scan driver chip and the cascaded data driver chips. More particularly, the data driver chips which are divided into two groups are separately cascaded and mounted on the display panel, and the signals are transmitted through the same flexible printed circuit board, thus decreasing the area of the flexible printed circuit board and the number of the flexible printed circuit board as needed. Moreover, besides through the flexible printed circuit board, partial or total signals can be alternatively transmitted to the scan driver chip through one group of the data driver chips, so as to enhance the reliability of signal transmission, and further, omit some flexible printed circuit boards to reduce the costs of manufacture.

Figure 2A:
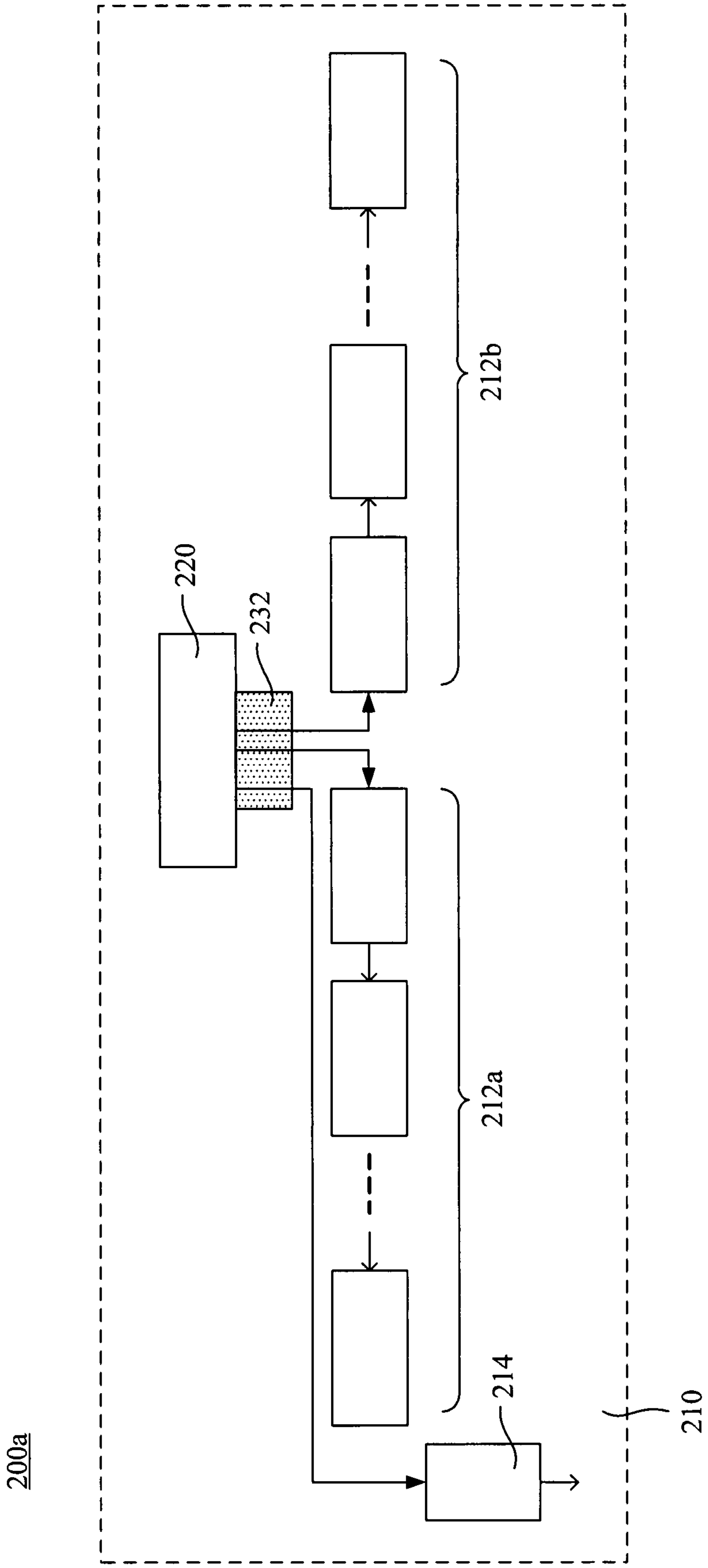
FIG. 2A is a display panel module according to one embodiment of the present invention.

FIG. 2A is a display panel module according to one embodiment of the present invention. The display panel module 200*a* has a display panel 210, a printed circuit board 220, a first group of data driver chips 212*a*, a second group of data driver chips 212*b*, at least one scan driver chip 214 and a first flexible printed circuit board 232. The first group of data driver chips 212*a* are cascaded to one another and mounted on a first side of the display panel 210. The second group of data driver chips 212*b* are cascaded to one another and mounted on the first side of the display panel 210. The scan driver chip 214 is mounted on a second side of the display panel 210. The first flexible printed circuit board 232 is disposed between the printed circuit board 220 and the display panel 210, and transmits signals to the first group of data driver chips 212*a*, the second group of data driver chips 212*b* and the scan driver chip 214, respectively.

The printed circuit board 220 generally includes a timing controller, a gamma voltage generator and a DC/DC converter. The timing controller and the gamma voltage generator separately generate the data signals, such as timing signals and gamma voltages, and the DC/DC converter provides the power signals. The embodiment transmits signals to the two groups of cascaded data driver chips 212*a* and 212*b* through the first flexible printed circuit board 232, and transmits signals to the scan driver chip 214 through the first flexible printed circuit board 232. Therefore, the signals from the printed circuit board 220 can be transmitted to the data driver chips 212*a* and 212*b* and the scan driver chip 214 by using the same first flexible printed circuit board 232.

More particularly, the first flexible printed circuit board can be disposed approximately near a middle of the first side of the display panel 210, and the first group of data driver chips 212*a* and the second group of data driver chips 212*b* can be disposed near the two sides of the display panel 210, respectively. With this configuration, the first flexible printed circuit board 232 can be electrically connected to the nearest data driver chips 212*a* and 212*b*, and transmits the signals to all of the data driver chips 212*a* and 212*b* by cascading.

The number of the first group of data driver chips 212*a* can be the same as the number of the second group of data driver chips 212*b*, thus balancing the signal delay possibly caused by different transmission distances between the two groups of data driver chips. Alternatively, according to other embodiments, the number of the first group of data driver chips 212*a* may be different from the number of the second group of data driver chips 212*b* because of the panel design, for example, the configuration of all element positions. In other words, the numbers of the data driver chips 212*a* and 212*b* in the two groups are not limited by the embodiments, persons skilled in the art should select the proper numbers of the data driver chips when practicing.

Figure 2B:
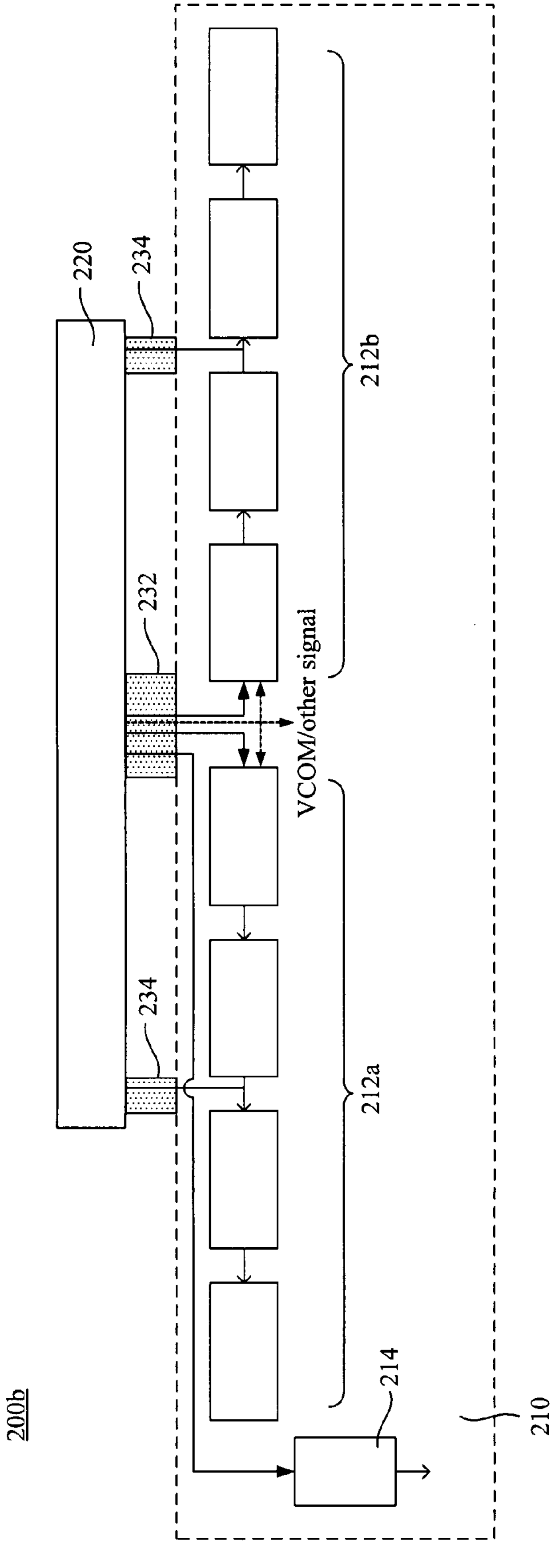
FIG. 2B is a display panel module according to another embodiment of the present invention.

FIG. 2B is a display panel module according to another embodiment of the present invention. In addition to the same elements as illustrated in FIG. 2A, the display panel module 200*b* of this embodiment further has a second flexible printed circuit board 234, which is disposed between the printed circuit board 220 and the display panel 234 and transmits power signals to at least one group of the first group of data driver chips 212*a* and the second group of data driver chips 212*b*. That is, the second flexible printed circuit board 234 can be used to transmit the power signals to the cascaded data driver chips 212*a* or 212*b* at a proper position, thus preventing a voltage drop due to a long signal transmission path.

According to the embodiment, each second flexible printed circuit board 234 can be disposed near one end of the printed circuit board 220. Moreover, the signals transmitted by the first flexible printed circuit board 232 include data signals and power signals. Therefore, every data driver chip 212*a* and 212*b* of the two groups can be supplied with the power signals from both of its two ends, so as to prevent a voltage drop caused by supplying the power signals only from one end thereof. In addition, as illustrated in FIG. 2B, the first flexible printed circuit board 232 can transmit VCOM or other signals as well as the above signals to the display panel 210.

According to another embodiment of the present invention, the scan driver chip 214 can be alternatively formed on the display panel 210 by gate-on-array (GOA) technique.

Figure 3:
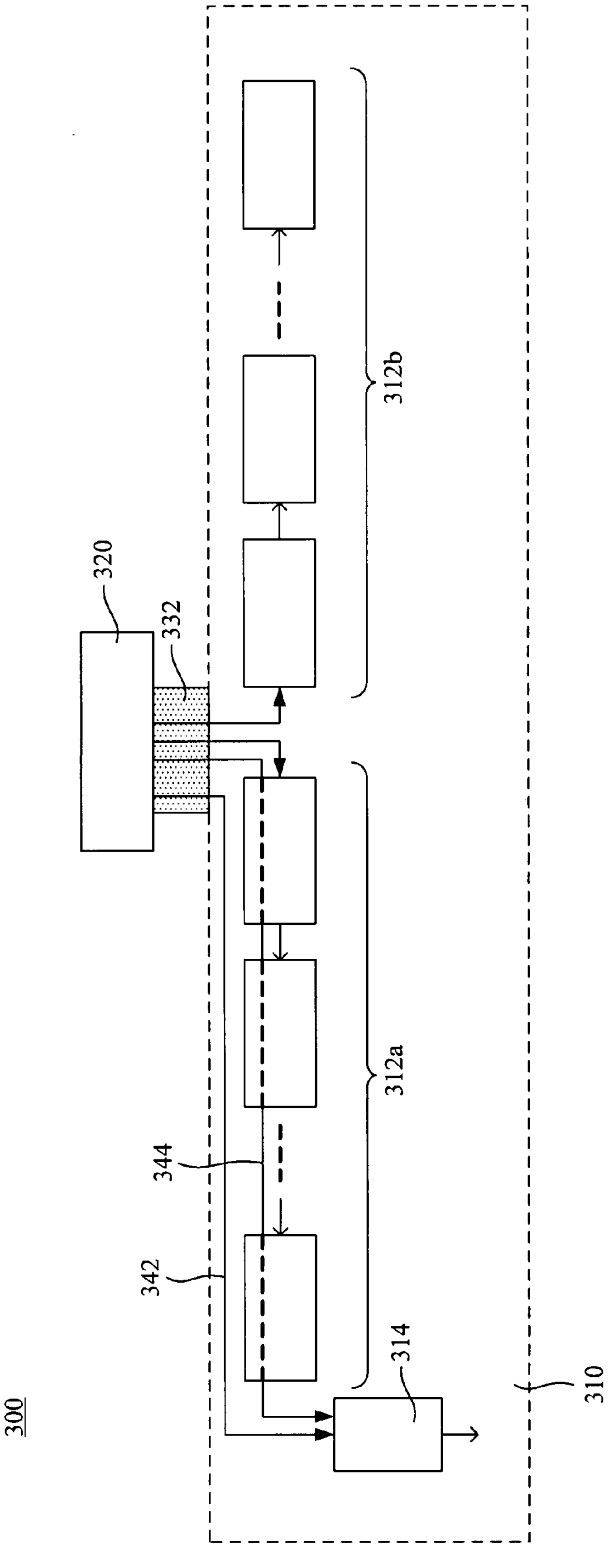
FIG. 3 is a display panel module according to another embodiment of the present invention.

FIG. 3 is a display panel module according to another embodiment of the present invention. The display panel module 300 has a display panel 310, a printed circuit board 320, a first group of data driver chips 312*a*, a second group of data driver chips 312*b*, at least one scan driver chip 314 and a first flexible printed circuit board 332. The first group of data driver chips 312*a* are cascaded to one another and mounted on a first side of the display panel 310. The second group of data driver chips 312*b* are cascaded to one another and mounted on the first side of the display panel 310. The scan driver chip 314 is mounted on a second side of the display panel 310.

The first flexible printed circuit board 332 is disposed between the printed circuit board 320 and the display panel 310, and transmits signals to the first group of data driver chips 312*a*, the second group of data driver chips 312*b* and the scan driver chip 314, respectively. It is noted that, the printed circuit board 320 of this embodiment can transmit the signals to the scan driver chip 314 through the first flexible printed circuit board 332 and the first group of data driver chips 312*a*.

More particularly, this embodiment can provide two signal transmission paths for the printed circuit board 320 to transmit the signals to the scan driver chip 314, and the first signal transmission path 342 is transmitting the signals simply through the first flexible printed circuit board 332, and the second signal transmission path 342 is transmitting the signals through the first flexible printed circuit board 332 and the cascading of the internal circuits in the first group of data driver chips 312*a*.

The two signal transmission paths 342 and 344 can be simultaneously or selectively used to transmit the signals. That is, the signals can be transmitted from the printed circuit board 320 to the scan driver chip 314 by only the first signal transmission path 342, or by only the second signal transmission path 344, or by both the first and second signal transmission paths 342 and 344.

Moreover, the two signal transmission paths 342 and 344 can be used to transmit the same signals together, or transmit different signals respectively, or transmit some significant signals by only one of them. Accordingly, persons skilled in the art can utilize these two signal transmission paths to effectively enhance the reliability of signal transmission, thus mitigating the possible signal loss or signal error while transmitting.

Figure 4:
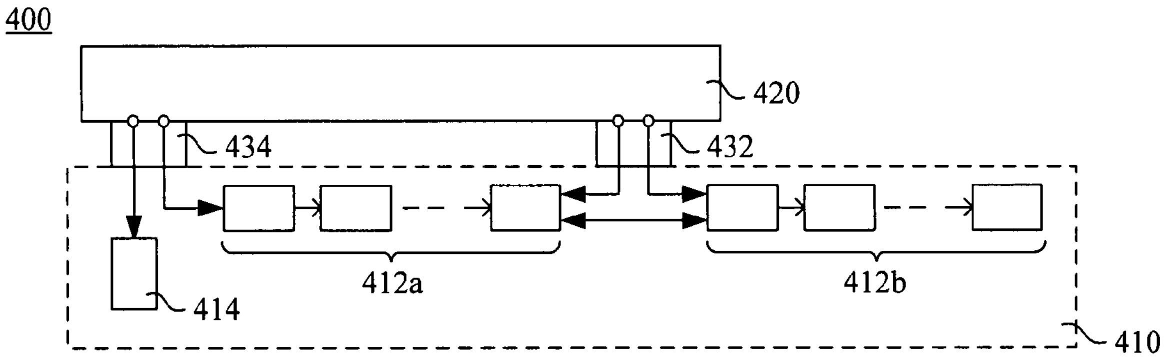
FIG. 4 is a display panel module according to another embodiment of the present invention.

FIG. 4 is a display panel module according to another embodiment of the present invention. A display panel module 400 has a display panel 410, a printed circuit board 420, a first group of data driver chips 412*a*, a second group of data driver chips 412*b*, at least one scan driver chip 414, a first flexible printed circuit board 432 and a second flexible printed circuit board 434. The first group of data driver chips 412*a* are cascaded to one another and mounted on a first side of the display panel 410. The second group of data driver chips 412*b* are cascaded to one another and mounted on the first side of the display panel 410. The scan driver chip 414 is mounted on a second side of the display panel 410.

The first flexible printed circuit board 432 is disposed between the printed circuit board 420 and the display panel 410, and transmits signals to at least one of the first group of data driver chips 412*a* and the second group of data driver chips 412*b*. That is, the first flexible circuit board 432 can transmit the signals to the first group of data driver chips 412*a* or the second group of data driver chips 412*b*, or transmit the signals to both the first and second groups of data driver chips 412*a* and 412*b*. The second flexible printed circuit board 434 is disposed between the printed circuit board 420 and the display panel 410, and transmits signals to the first group of data driver chips 412*a* and the scan driver chip 414, respectively.

The printed circuit board 420 generally includes a timing controller, a gamma voltage generator and a DC/DC converter. The timing controller and the gamma voltage generator separately generate the data signals, such as timing signals and gamma voltages, and the DC/DC converter provides the power signals. In this embodiment, the first flexible printed circuit board 432 can be disposed approximately near the middle of the first side of the display panel 410, and the first group of data driver chips 412*a* and the second group of data driver chips 412*b* can be disposed near the two sides of the display panel 410, respectively. With this configuration, the first flexible printed circuit board 432 can be electrically connected to the nearest data driver chips 412*a* and 412*b*, and transmits the signals to all of the data driver chips 412*a* and 412*b* by cascading.

The number of the first group of data driver chips 412*a* can be the same as the number of the second group of data driver chips 412*b*, thus balancing the signal delay possibly caused by different transmission distances between the two groups of data driver chips. Alternatively, according to other embodiments, the number of the first group of data driver chips 412*a* may be different from the number of the second group of data driver chips 412*b* because of the panel design, for example, the configuration of all element positions. In other words, the number of the data driver chips 412*a* and 412*b* in the two groups are not limited by the embodiments, persons skilled in the art should select the proper numbers of the data driver chips when practicing.

Figure 5A:
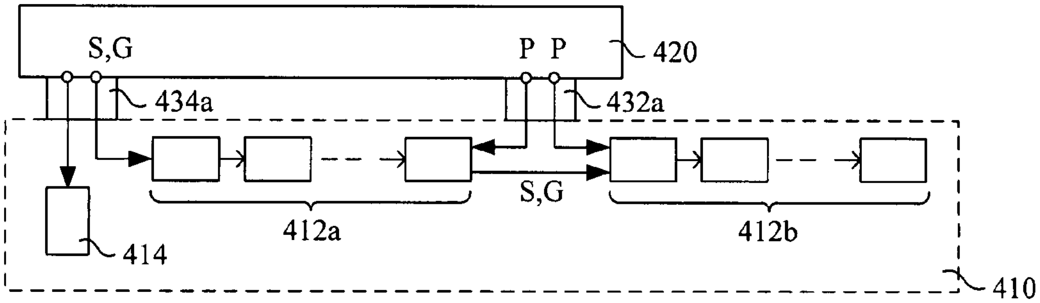
FIGS. 5A-5D illustrate several signals transmissions provided for the embodiments as stated above, respectively.

FIGS. 5A-5D illustrate several signal transmissions provided for the embodiments as stated above, respectively. As illustrated in FIG. 5A, the first flexible printed circuit board 432*a* transmits power signals (P) to the first group of data driver chips 412*a* and the second group of data driver chips 412*b*. The second flexible printed circuit board 434*a* transmits control signals (S) and gamma voltages (G) to the first group of data driver chips 412*a*, and transmits control signals (S) and gamma voltages (G) to the second group of data driver chips 412*b* through the first group of data driver chips 412*a*.

Figure 5B:
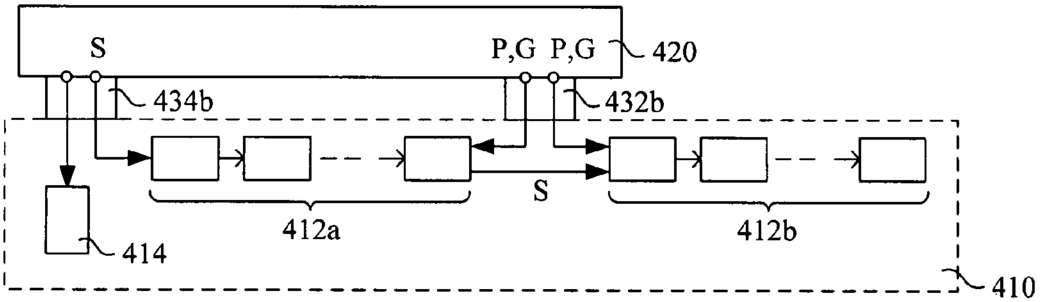

As illustrated in FIG. 5B, the first flexible printed circuit board 432*b* transmits power signals (P) and gamma voltages (G) to the first group of data driver chips 412*a* and the second group of data driver chips 412*b*. The second flexible printed circuit board 434*b* transmits control signals (S) to the first group of data driver chips 412*a*, and transmits control signals (S) to the second group of data driver chips 412*b* through the first group of data driver chips 412*a*.

Figure 5C:
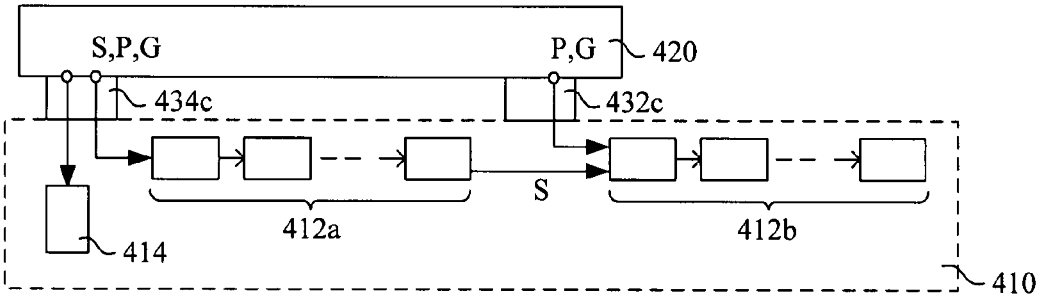

As illustrated in FIG. 5C, the first flexible printed circuit board 432*c* transmits power signals (P) and gamma voltages (G) to the second group of data driver chips 412*b*. The second flexible printed circuit board 434*c* transmits control signals (S), power signals (P), and gamma voltages (G) to the first group of data driver chips 412*a*, and transmits control signals (S) to the second group of data driver chips 412*b* through the first group of data driver chips 412*a*.

Figure 5D:
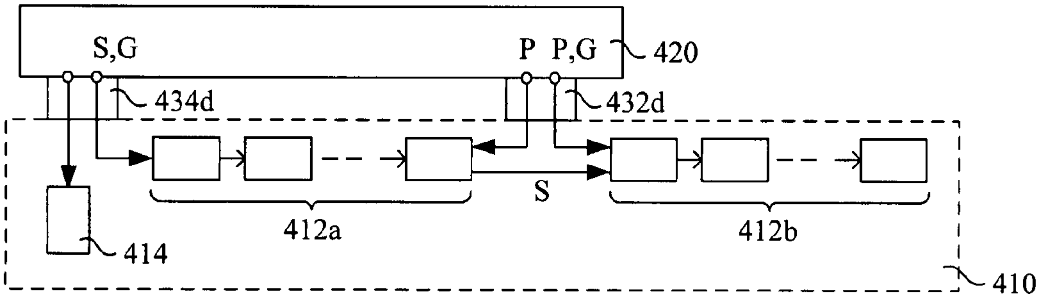

As illustrated in FIG. 5D, the first flexible printed circuit board 432*d* transmits power signals (P) to the first group of data driver chips 412*a*, and transmits power signals (P) and gamma voltages (G) to the second group of data driver chips 412*b*. The second flexible printed circuit board 434*d* transmits control signals (S) and gamma voltages (G) to the first group of data driver chips 412*a*, and transmits control signals (S) to the second group of data driver chips 412*b* through the first group of data driver chips 412*a*.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A display panel module, comprising:

a printed circuit board;

a display panel having a first side and a second side;

a first cascaded group of data driver chips mounted on the first side of the display panel;

a second cascaded group of data driver chips mounted on the first side of the display panel;

at least one scan driver chip mounted on the second side of the display panel;

a first flexible printed circuit board, disposed between the printed circuit board and the display panel, for transmitting signals including a power signal to the first group of data driver chips, the second group of data driver chips and the scan driver chip, respectively, the first flexible printed circuit board cascading the power signal to a first plurality of data driver chips in the first and second groups separately; and a second flexible printed circuit board, disposed between the printed circuit board and the display panel, for transmitting signals including the power signal to at least one of the first group and the second group, the second flexible printed circuit board cascading the power signal to a second plurality of data driver chips excluding the data driver chips in the first plurality, in the first and second groups separately.

2. The display panel module as claimed in claim 1, wherein the first flexible printed circuit board is disposed adjacent to the middle of the first side of the display panel.

3. The display panel module as claimed in claim 1, wherein the number of the first group of data driver chips is the same as the number of the second group of data driver chips.

4. The display panel module as claimed in claim 1, wherein the number of the first group of data driver chips is different from the number of the second group of data driver chips.

5. The display panel module as claimed in claim 1, wherein the second flexible printed circuit board is disposed adjacent to one end of the printed circuit board.

6. The display panel module as claimed in claim 1, wherein the signals comprise data signals and power signals.

7. The display panel module as claimed in claim 1, wherein the printed circuit board transmits the signals to the scan driver chip through the first flexible printed circuit board and the first group of data driver chips.

8. The display panel module as claimed in claim 1, wherein the printed circuit board transmits the signals to the scan driver chip through the first flexible printed circuit board.

9. The display panel module as claimed in claim 1, wherein the display panel includes a signal transmission path for transmitting the signals.

10. The display panel module as claimed in claim 9, wherein the signal transmission path is parallel to a cascading signal propagation path through at least one of the first group and the second group of data driver chips.

* * * * *